Figure 1:
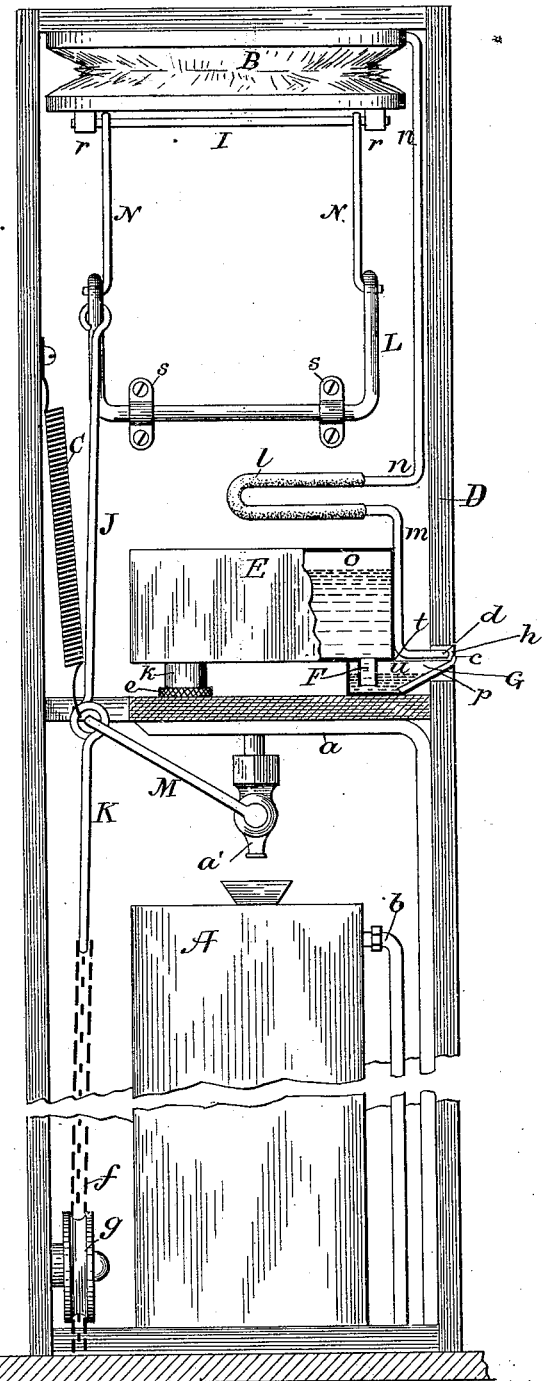

(No Model.) 2 Sheets—Sheet 1.

F. J. MITCHELL
APPARATUS FOR DISINFECTING WATER CLOSETS, &c.

No. 343,593. Patented June 15, 1886.

ATTEST:
J. H. Hundle
Oscar Haase

INVENTOR:
Frederick J. Mitchell
BY Leonard B. Setro
his Attorney

N. PETERS, Photo-Lithographer, Washington, D. C.

(No Model.) 2 Sheets—Sheet 2.
F. J. MITCHELL
APPARATUS FOR DISINFECTING WATER CLOSETS, &c.
No. 343,593. Patented June 15, 1886.
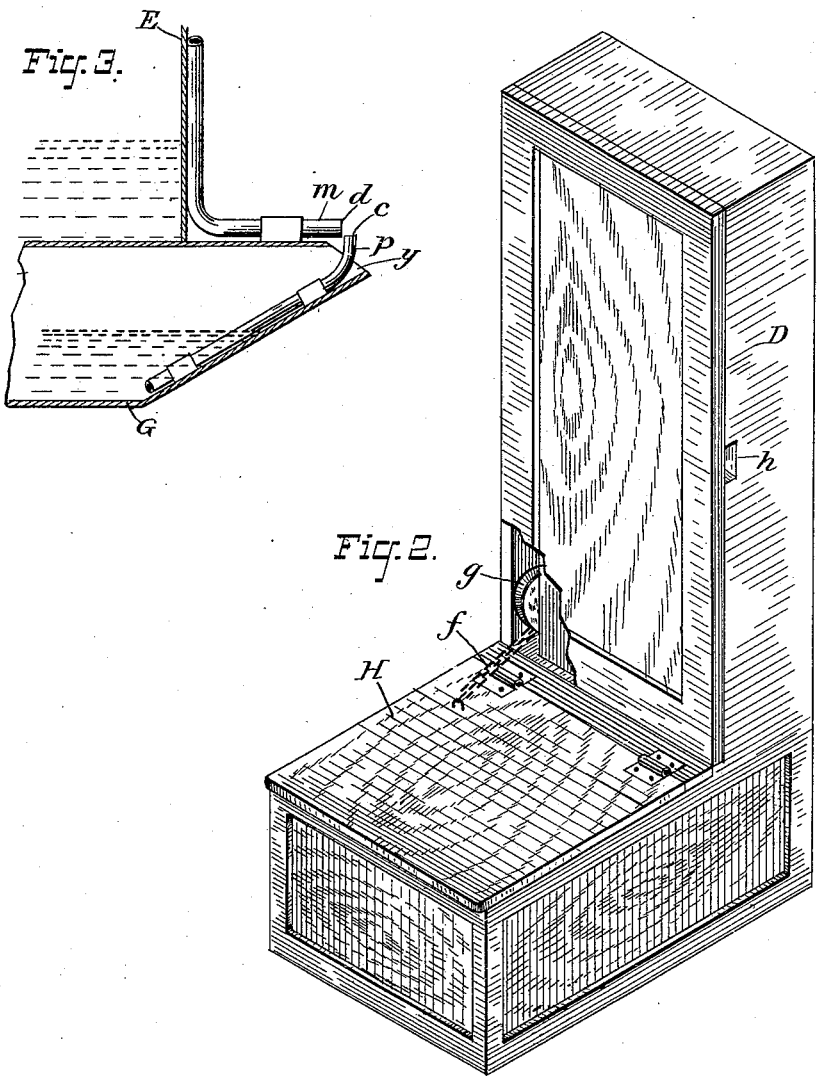
ATTEST:
INVENTOR:
Frederick J. Mitchell
By Leonard J. Sutro
his Attorney

UNITED STATES PATENT OFFICE.

FREDERICK J. MITCHELL, OF NEW YORK, N. Y., ASSIGNOR TO ALBERT L. COHN, OF SAME PLACE.

APPARATUS FOR DISINFECTING WATER-CLOSETS, &c.

SPECIFICATION forming part of Letters Patent No. 343,593, dated June 15, 1886.

Application filed February 26, 1886. Serial No. 193,374. (No model.)

*To all whom it may concern:*

Be it known that I, FREDERICK J. MITCHELL, a subject of the Queen of Great Britain, and a resident of New York city, in the county of New York and State of New York, have invented certain new and useful Improvements in Apparatus for Disinfecting Water-Closets and the Like, of which the following is a specification.

My improvement relates to the system of disinfecting water-closets and the like set forth in Reissued Letters Patent of the United States, No. 9,068, of February 10, 1880, granted to Edward J. Mallett, Jr. Under that system the closet-bowl is supplied with a suitable disinfecting-liquid—such as chloride of zinc—while air charged with thymol or other suitable disinfectant is intermittently discharged into the closet-room.

My improvement has reference to that portion of the apparatus employed in the system above referred to which intermittently supplies air, and which in said Letters Patent of Mallett is distinguished as the "aerial disinfector," and which said Mallett has claimed to have improved upon by a plunger covered or provided with an absorbent material, as shown and described in his United States Letters Patent No. 253,400, dated February 7, 1882. The particular aerial disinfector or air-disinfector which is shown and described in his said Letters Patent of February 7, 1882, contains a plunger and absorbent material, which, by intermittent plunging into and drawing out of the compartment containing the disinfectant, allows the absorbent material to absorb some of the fluid and evaporate into the air. This device, while effective for the purpose for which it was designed, is, nevertheless, insufficient to thoroughly impregnate the air in the closet-room with the disinfectant. I have found that in lieu of employing this means of evaporating the disinfectant into the closet-room it would be much more effective to atomize the liquid itself into the closet-room by means of an atomizing contrivance and an automatic self-supplying receptacle on which the atomizing contrivance acts, and to have this atomizing contrivance connected with and operated by the closet lid, seat, water-lift, door, or any other part of the closet or closet-room which is moved whenever the water-closet is entered or used. The instrumentality which I employ is a bellows arrangement acting upon portions of the thymol or other disinfecting solution, which disinfectant by pneumatic action is brought to a position where the bellows can act upon and atomize it. When the bellows is opened, it sucks in air through a valve, hereinafter described, and when closed that air acts in the pneumatic manner mentioned by the aid of a pipe connected with the bellows, and a receptacle containing the disinfectant, also containing a small pipe. The bellows obtains its movement from some appropriate part of the closet, preferably the water-closet lid, in the manner hereinafter described, and substantially in the same way as does the plunger device in said Letters Patent dated February 7, 1882; but a spring, crank, and arms are also used by me.

The nature of my improvement and the manner in which the same is or may be carried into effect will be understood by reference to the accompanying drawings, in which—

Figure 1 is a front elevation of the whole apparatus commonly known as the "germicide," (with the front of the case in which it is placed removed,) and showing part of the box or chamber E and the whole of the trough G in section, so as to disclose their interior. Fig. 2 represents a perspective view with a portion of the case broken away, in order to show the operating-chain connected with the closet-lid; and Fig. 3 represents a detail view of a portion of the atomizing device.

A is the box containing chloride of zinc or other disinfecting substance. From the water-service pipe extends a small pipe, $a$, which terminates in a faucet, $a'$, overhanging the box A. Water in quantity determined by the faucet trickles from the faucet into the box, and, passing down into the chloride of zinc, makes its way out, impregnated with the zinc chloride, through an overflow-pipe, $b$, whence it is discharged continuously into the bowl of the water-closet. This portion of the apparatus is the "liquid-disinfector," so called in the aforesaid Letters Patent, and requires no further explanation.

I come now to the air-disinfector, in reference to which my present improvement is specially designed. Within the case D, above the box A, is a box or chamber, E, preferably made of metal, containing a solution of thymol or other proper disinfectant, antiseptic, or perfume. This fluid is poured into the box E, as hereinafter mentioned. At one end of the box E is a trough, G, soldered or fastened to the box E, and communicating therewith by means of pipe F, and into this trough G the pipe F from the box E dips to within a short distance of the bottom of the trough. This pipe F is designed to keep a constant level of fluid in the trough G as long as any fluid is in the box E. The fluid in the box E descends into the trough G until it reaches about on a level with the mouth or bottom end of the pipe F, which it then necessarily seals by preventing the admission of air into the box E. As the fluid in the trough G is consumed (in the manner hereinafter more fully described) by coming up and out through the capillary pipe $p$ and its opening $c$, the level of fluid is lowered in the trough thereby, to that extent unsealing the mouth of the tube F, and so allowing a quantity of the fluid equal in volume to what was consumed to descend into the trough, and so again sealing the mouth of the pipe F until the next action which draws the fluid out through the pipe $p$. The pipe or tube $p$ is soldered to the inside of the trough, and is very small, and projects upward a little above the top of the trough G, and extends downward to within a short distance from the bottom of said trough.

In close proximity to the end $c$ of the pipe $p$ is the end of pipe $m$, which pipe is of a little larger diameter, and is bent, preferably, upward and backward over the top of the box E. This pipe $m$ is an air-tube, and continues up and forms a connection with the delivery air-tube $n$ of the bellows B by means of the flexible (preferably rubber) tube $l$. This rubber tube allows the box E to be turned upside down, although the pipe $m$ is soldered thereto to steady it. This rubber tube is easily removed, if desired. The bellows is caused to move by means of the bent arm or crank L, which is attached loosely to the bellows by means of rods I and N N and hangers $r\ r$, as shown in the drawings, or other suitable instrumentality. The bellows is secured to the top of the case D. It is furnished at the bottom with an ordinary flap or lifting valve for the admission of air, and is preferably made of rubber or some material which will resist the deteriorating conditions under which it operates. The upper end of the pipe $n$ is fitted into the top of the bellows, so that through that pipe the air is delivered from the bellows, as the flap-valve will not allow the air to escape through the bottom of the bellows. The bellows in this instance is designed to be operated by the closet-lid H, to which the chain $f$ is attached, (see Fig. 2,) and to this end the bellows is connected with the chain by the rods K I J N and the crank L, as above mentioned, and also connected with the action of the spring C by the rods I and J and crank L. The crank is held in position by means of the bearings $s\ s$, fastened to the back of the case D, and revolves forward and backward and downward and upward when the instrumentality is applied, as herein described. The spring C is preferably at one end connected with the rod K, and at the other end attached to the side of the case D. It is evident that when the chain $f$, by the action of closing the water-closet lid H, is drawn down, the crank or arm L, being drawn outward and downward by the rods K and J, opens the membranes of the bellows, and the air thereby entering through the flap-valve thereof fills the bellows. The spring C is stretched by closing the lid. In raising the lid the spring C, being released from its tension thereby and allowed to draw together thereupon, by means of the rod J, pushes the crank L up again into its original position and closes up the bellows, thereby forcing the air out through the pipe $n$, and the air comes out of the lower end, $d$, of pipe $m$ with great force. The air blowing over the end of pipe $p$ forms a suction, which draws up some of the fluid through that pipe out of the trough G, and at the same time atomizes the fluid by the strong current of air, and blows, disseminates, and atomizes it into the room through the opening $h$ on the side of the case D. The current of air from the bellows ceases, of course, as soon as the bellows is quite empty. The top of the trough G around the end $c$ of pipe $p$ is open, and there is atmospheric pressure on the liquid in the trough; but, as shown hereinafter, there is no pressure on the liquid in the box E. It follows that as soon as any liquid is drawn out of the trough G, to a certain extent unsealing the mouth of pipe F, an equal volume of liquid flows down into the trough G from the box E, thereby sealing up the pipe F to the same extent as before. To clearly understand this, it must be mentioned that in filling the box E it is turned top side down, so that the trough G would be above at the time. The fluid being then poured into the box E through the pipe $k$ fills the box E, after which the cap $e$ is tightly screwed on, making it air and liquid tight. Then the box E is again turned over, so that the trough G is again beneath, as when in use. The result is, that some of the fluid flows from box E into trough G, leaving the vacuum $o$ in box E. The trough G, however, only fills to about on a level with the bottom or mouth of pipe F, because when it reaches about or slightly above that level the mouth of the pipe is sealed up, there being no pressure over the liquid in box E, and, on the other hand, there is atmospheric pressure over the liquid in the trough G, as the top of the trough G around the end $c$ of pipe $p$ is open, which opening also serves to catch the drip, which returns to the trough. Now, whenever a portion of the liquid is drawn out of the trough through the pipe $p$, (by the action of the bellows,) to that extent unsealing the mouth of pipe F, an equal portion drops down from box E and again seals up pipe F, so that the liquid in trough G is always supplied so long as any remains in box E, and the liquid in the trough always fills to the same level, and no more, leaving the air-space $n$ therein.

In the accompanying drawings I have shown the particular improvement of faucet, $a'$, which is described in United States Letters Patent of E. M. Chase, dated August 19, 1884, No. 303,707, to show that my improvement can be made to act in combination also with the improvement therein claimed of insuring the opening of the channels in such faucet by means of the rod M, as the action of the chain $f$ and spring C communicates itself to the rod M, as well as to the bellows B in the drawings.

It is manifest that the bellows may obtain its motion not alone from the closet-lid, although this is the most convenient instrumentality, but from any other appropriate part of the closet or closet-room which is adapted to be moved when the closet is entered or used. It is also manifest that the particular means employed to connect the bellows with the part from which it derives its movement may be widely varied.

What I claim as new, and desire to secure by Letters Patent, is—

1. The combination, with a water-closet or the like, of a box to contain disinfecting-liquid and a bellows having a pipe through which air blows from the bellows over the end of another pipe, which latter pipe is in a trough of said box, such bellows being connected with and operated by a movable part of the closet, (as, for instance, the closet-lid,) substantially as and for the purposes hereinbefore set forth.

2. The combination, with a water-closet, of a box to contain disinfecting-liquid and a bellows having a pipe through which air is blown from the bellows over the end of another pipe, which latter pipe is in a trough of said box, such bellows being connected with and operated by a movable part of the closet or closet-room,) as, for instance, the closet-lid,) substantially as and for the purposes hereinbefore set forth.

3. The combination of box E, having opening $k$, that can be tightly closed, pipe F, trough G, capillary pipe $p$, and an air suction and forcing device to blow air over the end of said pipe $p$, all adapted for use substantially as described.

4. In combination with a water-closet, the box E, having opening $k$, that can be tightly closed, pipe F, trough G, capillary pipe $p$, and an air suction and forcing device to blow air over the end of said pipe $p$, all adapted for use substantially as described.

5. In combination with a water-closet, the box E and trough G, communicating therewith, pipe $p$, and an air suction and forcing device to blow air over the end of said pipe, all adapted for use substantially as described.

6. In combination with a water-closet or the like, the box E, containing disinfecting-liquid, and having opening $k$ and cap $e$, trough G, which is supplied with disinfecting-liquid from such box, and which has a pipe, $p$, and an air suction and forcing device to blow air over the end of such pipe, all adapted for use substantially as described.

7. In combination with a water-closet or the like, the box E, containing disinfecting-liquid, and having opening $k$, that can be tightly closed, and trough G, communicating with box E, such trough having pipe $p$ and an air suction and forcing device to blow air over the end of such pipe, all adapted for use substantially as described.

8. The combination of box E, containing disinfecting-liquid, and having opening $k$ and cap $e$, trough G, communicating with box E, pipe $p$, and an air suction and forcing device to blow air over the end of such pipe, such air suction and forcing device being operated by and connected with the water-closet, substantially as described.

9. The combination of box E, containing disinfecting-liquid, and having opening $k$ and cap $e$, trough G, communicating with box E, pipe $p$, arm M, and an air suction and forcing device, such arm and device being operated by and connected with the water-closet, substantially as described.

Signed at New York city, in the county of New York and State of New York, this 24th day of February, A. D. 1886.

FREDERICK J. MITCHELL.

Witnesses:
P. B. CAVANAGH,
LOUIS WERMER.